(No Model.)

A. H. ROWAND.
PIPE COUPLING.

No. 378,150. Patented Feb. 21, 1888.

Attest:
Sidney P. Hollingsworth
W. R. Kennedy

Inventor:
A. H. Rowand
By his Atty.
Philip T. Dodge.

UNITED STATES PATENT OFFICE.

ARCHIBALD H. ROWAND, OF ALLEGHENY, PENNSYLVANIA.

PIPE-COUPLING.

SPECIFICATION forming part of Letters Patent No. 378,150, dated February 21, 1888.

Application filed January 22, 1887. Serial No. 225,143. (No model.)

*To all whom it may concern:*

Be it known that I, ARCHIBALD H. ROWAND, of Allegheny, in the county of Allegheny and State of Pennsylvania, have invented certain Improvements in Pipe-Couplings, of which the following is a specification.

The aim of this invention is to provide a simple coupling which may be readily applied and which will maintain a perfectly-tight joint, notwithstanding the high pressure of the fluid in the pipe or the bending of the pipe at the joint; and to this end it consists in combining with the pipe collars screwed upon its ends, elastic packing in rear of these collars, a contractile inclosing-shell, and a filling of plastic material, all as hereinafter described in detail.

Figure 1:
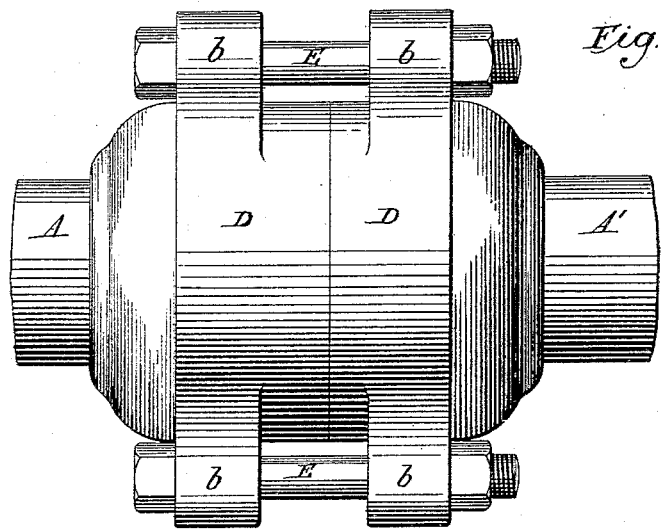
Figures 2, 4:
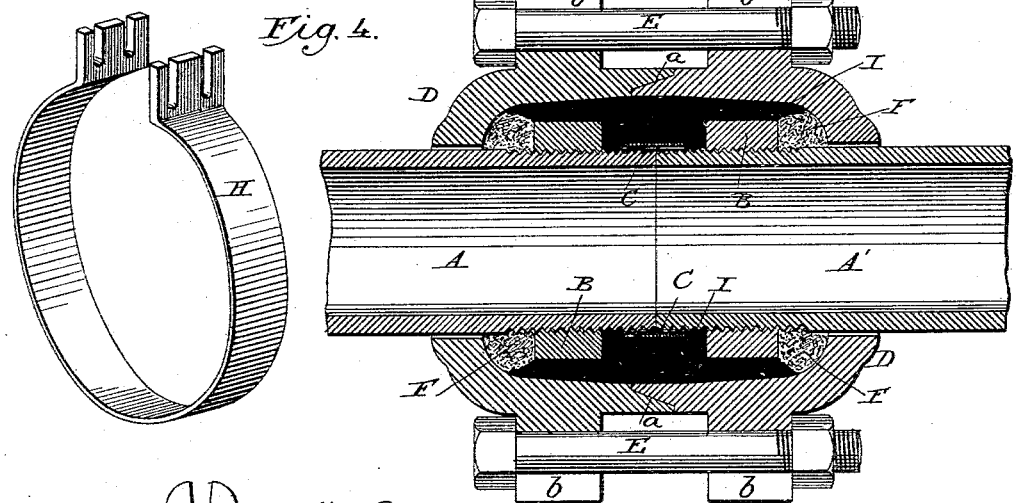
Figure 3:
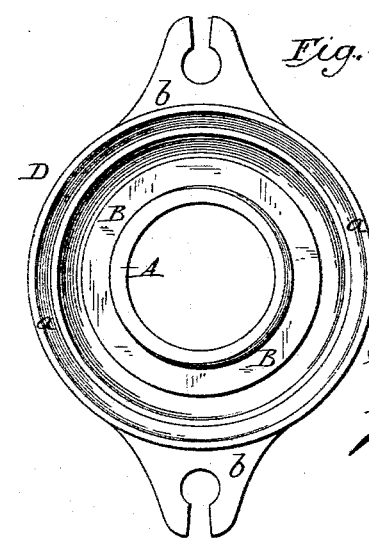

In the accompanying drawings, Figure 1 is a side elevation of a pipe provided with my coupling; Fig. 2, a longitudinal central section of the same; Fig. 3, an end view of one of the coupling-sections and the pipe therein; Fig. 4, a perspective view of the detachable band used when filling the shell with plastic material.

Referring to the drawings, A A' represent two sections of pipe which it is required to connect. In applying my improvement, I thread the abutting ends of the pipe externally and screw on each end a metal ring or collar, B, carrying the same backward a distance of half an inch (more or less) from the extremity, as shown. Behind each of these collars I apply around the pipe an elastic packing, F, of yarn, rubber, or other suitable material. Around the two ends of the pipe I apply a loose ring or collar, C, covering the joint and serving to prevent the plastic material, hereinafter mentioned, from finding its way into the interior in the event of the pipe being bent so as to open the joint or of the joint being otherwise opened.

I inclose the ends of the pipe, the collars, and the packing by a contractile metal shell consisting of the two corresponding parts D D. These parts, which are of a cup-like form, encircle the respective parts of the pipe loosely behind the collars and the elastic packing. At their inner ends they are tapered to flange-bearings adapted to fit one tightly within the other, as shown at $a$, and at the periphery they are provided with ears $b$ to receive bolts E, by which they are drawn tightly together. Before thus drawing the parts together I apply between them a temporary encircling and connecting band, H, such as shown in Fig. 4, securing it by thumb-screws, connecting its ends and leaving between the latter an opening through which I introduce a plastic or molten packing material, I, taking care to see that it fills the entire internal space and covers the sleeve C and the collars. The band is then removed and the shell contracted, thereby forcing the elastic packing F tightly against the collars and urging the ends of the pipe together, and at the same time compressing the plastic filling I and forcing the same into intimate contact with all the surfaces enveloped thereby. The result is a perfect sealing of the pipe and a confinement of the sealing material so that it cannot escape or uncover the joints under any conditions encountered in practice.

The band and its uses, as above described and as shown in Fig. 4, but not herein claimed, is reserved for the subject of a separate application.

The use of the elastic packing F between the collars and the ends of the shells in connection with the shell loosely encircling the pipe, so that the sections of the latter may be thrown out of line, is of special advantage in that it permits the two parts of the pipe to change their relations or move out of line without affecting the joint or causing leakage.

I am aware that pipes have been provided with external flanges at their abutting ends and the ends inclosed in coupling sleeves or shells of various forms with packing therein, and my invention is therefore limited to the particular construction herein shown, which was specially devised for and which in practice has been found particularly efficient in holding gases under high pressure in pipes which are liable to change position or to be thrown out of line. It is to be noted as a peculiarity of my construction that the flanges are fixed on the pipe and that the shell acts directly to compress and confine the elastic packing between its ends and the flanges.

Having thus described my invention, what I claim is—

1. The two pipe-sections, each provided with a fixed annular flange at a distance from its end, in combination with the elastic packings surrounding the pipes in rear of the flanges, the two-part shell loosely encircling the pipe-sections behind the respective packings and flanges and bearing against the packings, the plastic material filling the interior of the shell and surrounding the pipe and flanges, and the bolts or connecting devices holding the shoulder-sections firmly together.

2. The two pipe-sections provided with flanges fixed thereon, in combination with an elastic packing, F, encircling the sections beyond the respective flanges, and the two-part shell or casing loosely encircling the two sections to admit of said sections changing their relative positions, and bearing at its ends directly and firmly against the packings, as shown and described.

3. The two pipe-sections, each provided with an external flange fixed thereon at a distance from the end, in combination with the ring C, encircling the adjacent ends of the pipe, the packing F F, applied behind the flanges, the two-part shell having the annular flange-joint $a$, the plastic filling, and the bolts for forcibly contracting the shell, whereby the shell-sections are seated firmly against the packings F and the plastic material forced into intimate contact with all the internal surfaces.

In testimony whereof I hereunto set my hand, this 14th day of January, 1887, in the presence of two attesting witnesses.

ARCHIBALD H. ROWAND.

Witnesses:
FRANK T. CHAPMAN,
ANDREW PARKER.